D. DAVIES AND D. JONES.
APPARATUS USED IN THE MANUFACTURE OF SHEET METAL PLATES.
APPLICATION FILED APR. 18, 1918.
1,422,085.
Patented July 11, 1922.
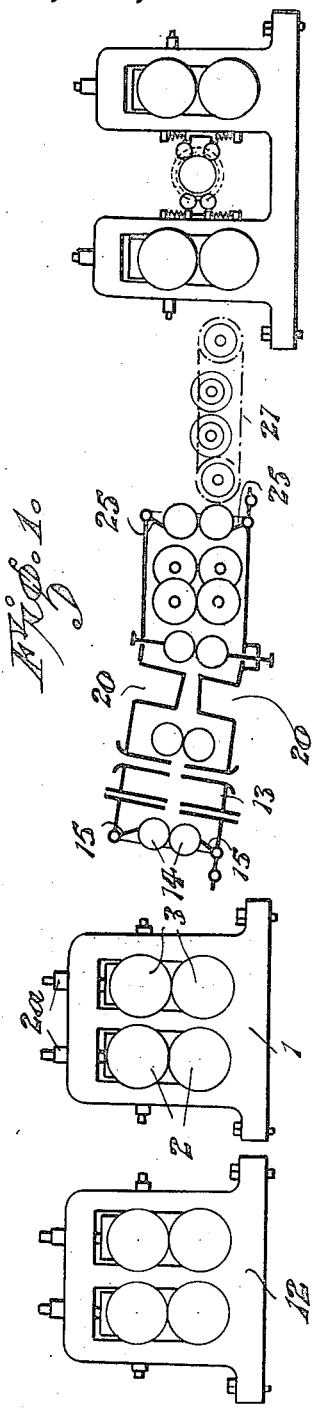
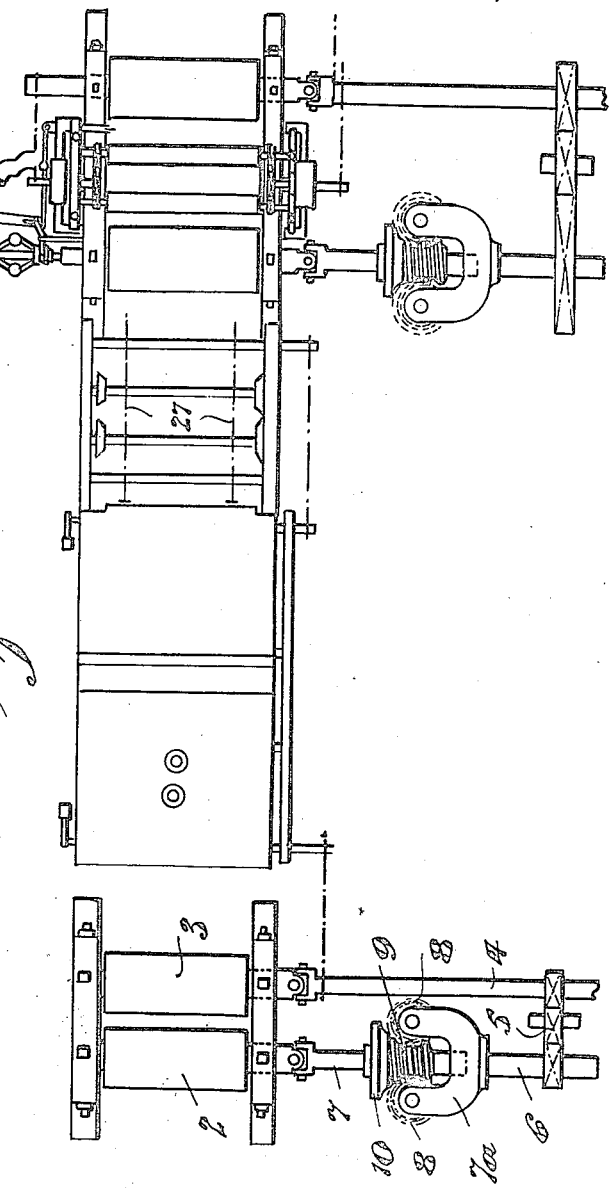

UNITED STATES PATENT OFFICE.

DAVID DAVIES, OF LLANELLY, AND DAVID JONES, OF TIRCOED, WALES.

APPARATUS USED IN THE MANUFACTURE OF SHEET-METAL PLATES.

1,422,085. Specification of Letters Patent. Patented July 11, 1922.

Application filed April 18, 1918. Serial No. 229,392.

*To all whom it may concern:*

Be it known that we, DAVID DAVIES, a subject of the Kingdom of Great Britain, residing at Awelfryn, Bigyn Park Terrace, Bigyn, Llanelly, Carmarthenshire, Wales, and DAVID JONES, a subject of the Kingdom of Great Britain, residing at Gorphwysfa, Tircoed, Glanamman, Wales, have invented Improvements in or Relating to Apparatus Used in the Manufacture of Sheet-Metal Plates, of which the following is a specification.

This invention comprises certain improvements in or relating to apparatus used in the manufacture of sheet metal plates, and especially for stretching or extending metal sheets, plates and the like, and is here shown in connection with means to carry out the continuous stretching, annealing, cleaning, polishing, pickling, washing, and coating of plates or sheets, whereby great economy and increase in production is obtained.

In order that this invention may be clearly understood and readily carried into practice, reference may be had to the appended explanatory sheets of drawings, upon which:—

Figure 1 is a diagrammatic elevation of my improved metal sheet stretching apparatus.

Figure 2 is a plan of the same.

In the drawings, 1 is a machine for stretching the plates, which comprises a pair of primary upper and lower rollers 2 and a pair of secondary upper and lower rollers 3. The two lower rollers 2, 3 are adapted to be driven; the two upper rollers 2, 3 are adapted to be adjusted in relation to the lower rollers, as for instance by screw 2ª in order to exert a pressure upon the sheet. The sheet is fed first between the rollers 2, from which it passes to the rollers 3. Between the rollers 2 and the rollers 3 it is adapted to be stretched. The rollers 2 are adapted to be driven at a slower peripheral speed than the rollers 3, and according to the pressure applied to the sheet between the rollers 2, so the degree of stretching may be adjusted. The driving mechanism for the primary lower roller 2 is, however, of such a character that it permits of the acceleration of these rollers to permit of the passage of the plate when drawn therethrough by the secondary rollers 3. In order to permit of this acceleration, the shaft driving the roller 2 is divided, and a one-way clutch is provided between the two parts thereof. The roller 2 is thus adapted to be positively driven, but it is enabled to "over-run" or accelerate in relation to its driving element. In Figure 2 we have shown a driving shaft 4 which directly drives the lower roller 3 through a universal joint, and which shaft 4, through an intermediate spur wheel 5, drives the shaft 6. This shaft 6 is adapted to drive a shaft 7 through a one-way clutch, and the said shaft 7 drives the lower of the rollers 2 through a universal joint.

One form of one-way clutch is shown in Figure 2, in which the shaft 6 carries a bracket 7ª in which two worm wheels 8 are mounted. These worm wheels 8 mesh with a worm 9 provided upon the shaft 7. Adjacent to the worm 9 is a clutch face provided upon an enlargement 10 fixed to the shaft 7. This clutch face is annular, and in radial section it is curved to conform with the circumferential periphery of the worm wheels 8. Rotation of the shaft 6 in a clockwise direction thus transmits power to the shaft 7, but the shaft 7 is enabled to over-run in a clockwise direction.

By such construction and combination of devices, the lower roller 3 is positively driven at a predetermined speed. The lower roller 2 is also positively driven, but at a gradually variable speed, the minimum of which has a fixed relationship with that of the driven roller 3. While the minimum speed of the slower driven roller 2 is in fixed and predetermined ratio to the speed of the more rapidly driven roller 3, yet such more slowly driven roll can increase its speed in a ratio gradually varying from zero, if necessary, to a speed equalling that of the more quickly driven roller 3. The positive drive provided for the pair of rollers 2 is only to convey the sheet until it is gripped by the pair of rollers 3 and directly the pair 3 grips the sheet, the latter then acts to drive the pair 2 and to progressively increase the speed thereof to the same speed as pair 3, minus the elongation or stretch of the metal sheet which takes place at the point between the two pairs of rollers 2 and 3, and this elongation is adjusted by the pressure applied by the screw pins on the pair of rollers 2.

We may provide a plurality of stretching apparatus, such as above described, in succession. In Figure 1 we have illustrated an additional stretching apparatus 12 in advance of that designated 1. The sheet may if desired be heated between its passages through these separate stretching apparatus.

After passing through the stretching rolls the sheet passes to an annealing plant of suitable construction, such as indicated at 20, and from thence through a cooling apparatus such as indicated at 25.

After passing out of the cooling apparatus 25, the sheet is conveyed to a mechanism for cleaning, polishing, or burnishing the sheet. A suitable conveyor mechanism is indicated at 27.

What we claim as our invention and desire to secure by Letters Patent is:—

1. In metal stretching apparatus of the class described, a pair of primary rollers, a pair of secondary rollers, means to positively drive one roller of each pair, the said positively driven primary roller at a lower rate of speed than the said positively driven secondary roller, and including means to permit the positively driven primary roller to progressively increase its speed until it reaches that of the said positively driven secondary roller.

2. In metal stretching apparatus of the character described, a pair of primary rollers, a pair of secondary rollers, means to positively drive one roller of each pair, the said positively driven primary roller at a lower rate of speed than the said positively driven secondary roller, such driving means comprising a shaft directly connected to the said positively driven secondary roller, a second shaft geared to said first named shaft for rotation therewith in the same direction, a bracket carried by said second named shaft, worm wheels arranged for revolution and mounted in said bracket, a third shaft in line with and independent of said second shaft, and directly connected to the said positively driven primary roller, a worm on said third named shaft and engaged by the worm wheel, and a clutch element also on said third named shaft and arranged to cooperate with said worm.

In witness whereof we have hereunto set our hands in the presence of two witnesses.

DAVID DAVIES.
DAVID JONES.

Witnesses:
DAVID FAUREUL,
T. BADGER.